United States Patent [19]

Tatsuguchi

[11] Patent Number: 4,608,610
[45] Date of Patent: Aug. 26, 1986

[54] JITTER COMPENSATION SYSTEM IN ROTARY RECORDING MEDIUM REPRODUCING APPARATUS

[75] Inventor: Kazuo Tatsuguchi, Sagamihara, Japan

[73] Assignee: Victor Company of Japan, Ltd., Yokohama, Japan

[21] Appl. No.: 295,232

[22] Filed: Aug. 21, 1981

[30] Foreign Application Priority Data

Aug. 22, 1980 [JP] Japan ............................ 55-115377
Aug. 22, 1980 [JP] Japan ............................ 55-115378

[51] Int. Cl.$^4$ ............................................. H04N 9/44
[52] U.S. Cl. .................................................. 358/324
[58] Field of Search ............... 358/322, 326, 337, 338, 358/342, 320, 321, 323; 360/36.1, 37.1

[56] References Cited

U.S. PATENT DOCUMENTS

| | | | |
|---|---|---|---|
| 3,419,675 | 12/1968 | Kihara | 358/338 X |
| 3,711,641 | 1/1973 | Palmer | 358/322 |
| 3,871,020 | 3/1975 | Wilber | 358/322 X |
| 3,934,262 | 1/1976 | Snopko | 358/322 |
| 3,959,815 | 5/1976 | Rotter et al. | |
| 3,965,482 | 6/1976 | Burrus | 358/322 |
| 4,198,658 | 4/1980 | Palmer | 358/338 |

FOREIGN PATENT DOCUMENTS

| | | | |
|---|---|---|---|
| 2521821 | 11/1976 | Fed. Rep. of Germany . | |
| 2646098 | 3/1978 | Fed. Rep. of Germany . | |
| 0024429 | 2/1977 | Japan | 358/322 |
| 0017216 | 2/1978 | Japan | 358/322 |
| 0127784 | 10/1980 | Japan | 358/322 |
| 1449955 | 9/1976 | United Kingdom . | |
| 1454901 | 11/1976 | United Kingdom . | |
| 1457407 | 12/1976 | United Kingdom . | |
| 1520004 | 8/1978 | United Kingdom . | |
| 1572346 | 7/1980 | United Kingdom . | |

Primary Examiner—Aristotelis M. Psitos
Attorney, Agent, or Firm—Louis Bernat

[57] ABSTRACT

A jitter compensation system in a rotary recording medium reproducing apparatus having a motor for rotating a rotary recording medium, and a reproducing transducer including a reproducing element for reproducing a recorded video signal from said rotary recording medium, comprises a separation circuit for separating a horizontal synchronizing signal from the video signal reproduced by the reproducing transducer, a circuit for supplying a reference signal, a phase comparator for comparing phases of the separated horizontal synchronizing signal and the reference signal supplied thereto, to produce a phase comparison error signal, a circuit for displacing the reproducing element of the reproducing transducer along a relative scanning direction with respect to the rotary recording medium, in response to the output error signal of the phase comparator, a variable frequency oscillator supplied with the output error signal of the phase comparator, and controlled of the output oscillation frequency, a detection circuit for detecting the rotational phase of the motor, and a control circuit for comparing phases of outputs of the variable frequency oscillator and the detection circuit, and controlling the rotation of the motor by an output error signal obtained as a result of the phase comparison.

6 Claims, 4 Drawing Figures

JITTER COMPENSATION SYSTEM IN ROTARY RECORDING MEDIUM REPRODUCING APPARATUS

BACKGROUND OF THE INVENTION

The present invention generally relates to jitter compensation systems in rotary recording medium reproducing apparatuses, and more particularly to a system capable of effectively performing jitter compensation so that the dynamic range of a jitter compensation mechanism of a reproducing transducer which reproduces recorded signals from a rotary recording medium, can be made narrow.

Reproducing apparatuses have been reduced to practical use, in which a recorded signal in a rotary recording medium (hereinafter simply referred to as a disc) in which an information signal such as a video signal and an audio signal is recorded as a variation in geometrical configuration, is reproduced as a variation in electrostatic capacitance between an electrode of a reproducing stylus of the reproducing transducer and the recording surface of the disc. However, when irregularity (wow and flutter) exists in the rotation of the turntable which is placed with the disc to rotate the disc, eccentricity exists in the center hole of the disc, distortion is introduced in the disc upon molding of the disc, and the like, jitter (error in the time axis) is introduced in the reproduced signal. The above jitter covers a frequency range from a relatively low frequency component corresponding to the rotational period of the disc due to such causes as the above irregular rotation and eccentric center hole, to a relatively high frequency component due to such causes as the above distortion in the disc, mainly, few hundreds Hz to 1.5 kHz.

In a case where the reproduced information signal is a color video signal, the above jitter gives rise to color shading, swinging of picture image in the reproduced picture of the receiver, and the quality of the reproduced picture greatly deteriorates. This deterioration in the reproduced picture is particularly notable in a so-called direct color system in which the color signal is directly recorded without frequency conversion.

Accordingly, in a conventional system, the frequency converted chrominance sub-carrier of the reproduced color video signal is frequency-converted (heterodyne-converted) back to the original chrominance sub-carrier frequency, and the phases of this chrominance sub-carrier which is frequency-converted into the original chrominance sub-carrier frequency, and a reference signal are compared. An output error signal obtained as a result of the above phase comparison controls an oscillator which generates a signal for performing the above frequency conversion, to reduce the deviation in the time axis upon frequency conversion. Furthermore, the cantilever which is provided with the reproducing stylus at the tip end thereof, is displaced towards a relative scanning direction of the reproducing stylus with respect to the disc, by the above output error signal. Hence, in the above conventional system, jitter compensation was performed by performing the above control operation in order to prevent the introduction of deviation in the time axis.

However, in the above conventional system, the output error signal obtained as a result of the phase comparison is established so as to have a characteristic suited for controlling the oscillator which generates the signal for performing the above frequency conversion. Therefore, the above output error signal is not necessarily suited for driving a jitter compensation mechanism (so-called arm stretcher) which displaces the above cantilever. Moreover, there was a disadvantage in that even when phase compensation is performed on the above output error signal, the jitter compensation cannot be sufficiently be performed.

On the other hand, when operating the disc reproducing apparatus in synchronism with a computer, when inserting letters and the like into the reproduced picture of the receiver by the reproduced signal from the reproducing apparatus from the outside, when operating the reproducing apparatus in synchronism with a television camera, and the like, for example, the reproducing apparatus must perform the reproducing operation in synchronism with an external reference signal.

Accordingly, when one attempts to realize the above by use of the prior art, a system may be considered in which a motor for rotating the disc is rotationally controlled by the external reference signal and a detected output of a rotational phase detector for the motor. In this system, the phases of the external reference signal and a reproduced color burst signal are compared at a phase comparator, to perform jitter compensation by displacing the cantilever, by controlling the jitter compensation mechanism by the output error signal obtained from the phase comparator.

However, when the disc is rotated in synchronism with the external reference signal, the operating position of the jitter compensation mechanism differs according to the phase angle with which the disc is placed onto the turntable with respect to the above rotational phase detector for the motor. That is, according to the phase angle of the above disc, there are cases where the cantilever must perform the jitter compensation operation by displacing about a center which is greatly separated from a neutral position of the jitter compensation mechanism. A similar situation occurs when deviation exists in a transferring mechanism for the reproducing transducer, and the transferring locus of the reproducing stylus of the reproducing transducer deviated from the radial direction of the disc. Hence, in order to sufficiently perform jitter compensation even in the above described case, the jitter compensation mechanism must have a sufficiently large dynamic range. However, it is difficult to construct a jitter compensation mechanism having the above sufficiently large dynamic range, and thus, sufficient jitter compensation cannot be performed.

When attempt is made to compensate all the phase difference at the jitter compensation mechanism by forming a DC coupling between the above phase comparator and the jitter compensation mechanism, a considerably large range is required as a displacing range for the cantilever which is displaced by the jitter compensation mechanism. On the other hand, when an AC coupling is formed between the above phase comparator and the jitter compensation mechanism, normal jitter compensation cannot be performed since the range of the displacing cantilever gets out of the phase detectable range due to the stationary phase error.

In addition, in obtaining the above reproduced color burst signal, the color burst signal at a point in time after elapse of a predetermined period of time from the horizontal synchronizing signal within the NTSC system color video signal, is extracted. However, when the system of the color video signal is of the PAL system, the phase of the color burst signal at the point in time after elapse of the predetermined period from the horizontal synchronizing signal, is not constant. Accordingly, in the case where the color video signal is of the PAL system, the reproduced color burst signal obtained by the above described method cannot be used for jitter compensation.

Furthermore, when performing a special reproduction such as still, slow-motion, or quick-motion reproduction by forcibly displacing the reproducing stylus of the reproducing transducer to an adjacent track towards the outer or inner peripheral direction of the disc, there are cases where the phase shifts by one cycle of the color burst signal, when the phases of the synchronizing signal within the video signal recorded in the disc do not coincide between adjacent tracks. Hence, due to the accumulation of the shift in phase, it becomes impossible to perform a servo operation since the above accumulation exceeds the dynamic range of the jitter compensation mechanism. Therefore, the above described problem relating to the phase shift by one cycle of the color burst signal, cannot be solved by use of the above jitter compensation system.

SUMMARY OF THE INVENTION

Accordingly, it is a general object of the present invention to provide a novel and useful jitter compensation system in a rotary recording medium reproducing apparatus in which the above described problems have been overcome.

Another and more specific object of the present invention is to provide a jitter compensation system in a rotary recording medium reproducing apparatus, in which phases of a reproduced signal and a reference signal are compared, an output error signal obtained as a result of the phase comparison is used to control a jitter compensation mechanism and also to control oscillation of a variable frequency oscillator, and the phase of an output of the variable frequency oscillator and the rotational phase of a motor for rotating the disc are compared, to control the rotation of the motor by an output obtained as a result of the phase comparison.

Still another object of the present invention is to provide a jitter compensation system in a rotary recording medium reproducing apparatus, in which only the direct-current (DC) component of the above output error signal is applied to the above variable frequency oscillator.

Another object of the present invention is to provide a jitter compensation system in a rotary recording medium reproducing apparatus, in which a voltage controlled crystal oscillator is used as the above variable frequency oscillator.

Other objects and further features of the present invention will be apparent from the following detailed description when read in conjunction with the accompanying drawings.

DETAILED DESCRIPTION

Figure 1:
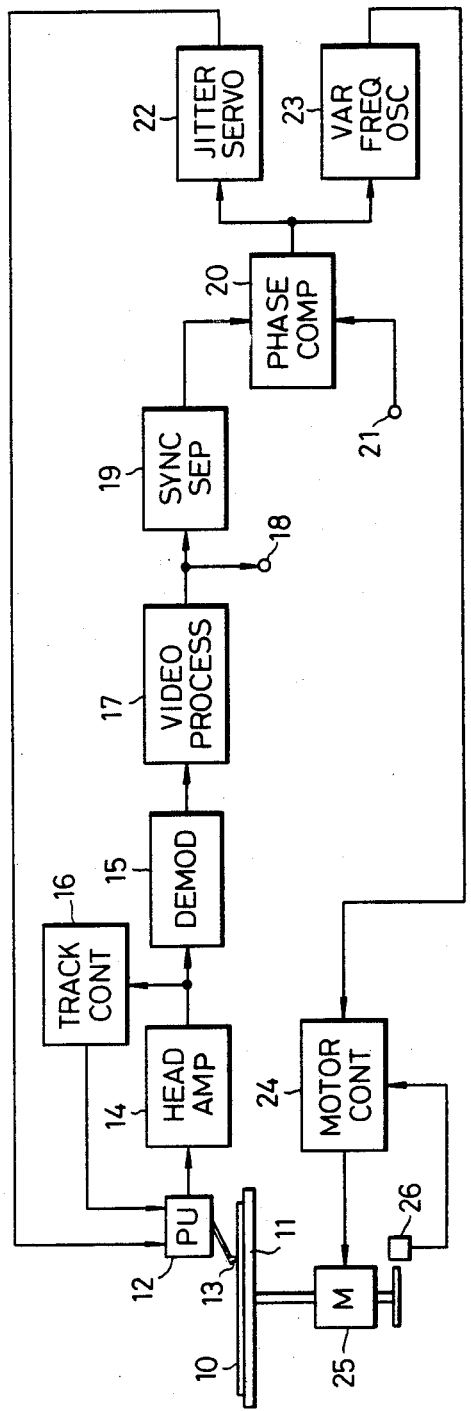
FIG. 1 is a systematic block diagram showing an embodiment of a jitter compensation system in a rotary recording medium reproducing apparatus according to the present invention.

In FIG. 1, a disc 10 is rotated at a predetermined speed by a turntable 11. A reproducing stylus 13 of a signal pickup device 12 makes contact with the recording surface of the disc 10, to pickup and reproduce the recorded signal from the disc 10. In the present embodiment of the invention, a video signal is recorded on the disc 10 as variations in geometrical configuration, and the recorded video signal is reproduced from the disc 10 as variations in electrostatic capacitance between the disc 10 and an electrode of the reproducing stylus 13. Further, reference signals for performing tracking control are recorded on the disc 10 besides the video signal, and these reference signals are reproduced together with the video signal.

The signal picked up and reproduced from the disc 10, is supplied to a demodulator 15 and a tracking control circuit 16 through a head amplifier 14. Reference signals for tracking control are separated at the tracking control circuit 16, and a tracking control signal is formed from these reference signals. The tracking control signal thus formed by the tracking control circuit 16 is supplied to coils 30a and 30b shown in FIG. 2, used for tracking within the pickup device 12. Accordingly, tracking control is performed so that the reproducing stylus 13 accurately scans over the video signal tracks on the disc 10.

Figure 2:
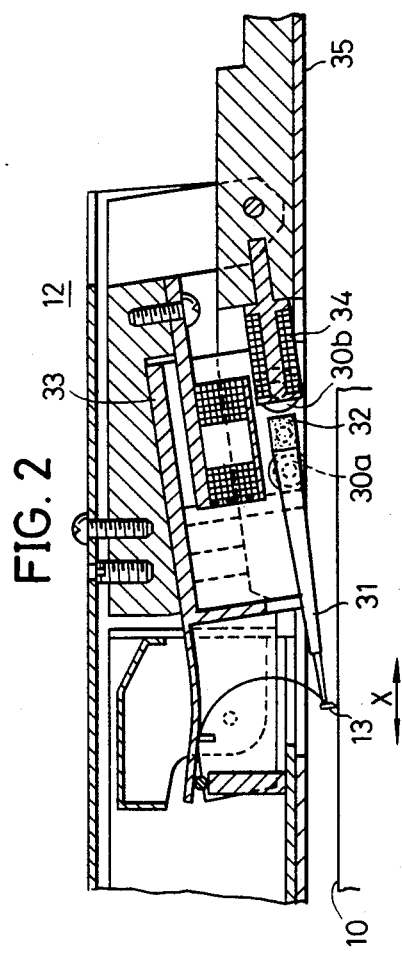
FIG. 2 is a side view in vertical cross-section, showing an example of a reproducing transducer provided with a jitter compensation mechanism.

In the signal pickup device 12 shown in FIG. 2, the reproducing stylus 13 is fixed at the tip end of a cantilever 31. The cantilever 31 is fitted and provided with a permanent magnet 32 at the rear end thereof. The rear end part of the cantilever 31 is supported at a lower part of a pickup cartridge frame 33 by a resilient support member (not shown). A coil 34 for jitter compensation, is provided at the rear along an axial line of the cantilever 31. The signal pickup device 12 is provided on a carriage 35, and the reproducing stylus 13 is transferred along the radial direction of the disc 10 when the carriage 35 is transferred.

On the other hand, the picked up video signal in FIG. 1 is demodulated at the demodulator 15, and then supplied to a video signal processing circuit 17 wherein a predetermined signal processing is performed. Hence, the demodulated video signal thus subjected to the predetermined signal processing, is supplied to an image receiving tube (not shown) of a receiver from a terminal 18, and reproduced as a reproduced picture.

The output video signal of the video signal processing circuit 17 is supplied to a synchronizing signal separation circuit 19 wherein the horizontal synchronizing signal is separated. The separated horizontal synchronizing signal is supplied to a phase comparator 20, and the phase of the horizontal synchronizing signal is compared with the phase of a reference signal obtained through a terminal 21. This reference signal from the terminal 21 has a frequency equal to the horizontal synchronizing signal frequency. The above reference signal applied to the terminal 21 is obtained from a reference signal oscillator external with respect to the reproducing apparatus, for example. In a case where the reproducing apparatus is to be operated in synchronism with a television camera, for example, the reference signal from the above external reference signal oscillator is also supplied to the television camera.

The output phase error signal of the above phase comparator 20 is supplied to a jitter servo circuit 22 and a variable frequency oscillator 23, respectively as a jitter compensation signal. A signal whose phase is compensated at the jitter servo circuit 22 so as to match the operational characteristic of a jitter compensation mechanism of the signal pickup device 12, is supplied to the jitter compensation coil 34 of the signal pickup device 12. Accordingly, jitter compensation is performed displacing the cantilever 31 along the longitudinal direction of the cantilever 31, that is, along a relative scanning direction of the reproducing stylus 13 on the disc 10, so that the jitter is not introduced. The above direction towards the relative scanning direction of the reproducing stylus 13 is indicated by an arrow X in FIG. 2.

Figure 3:
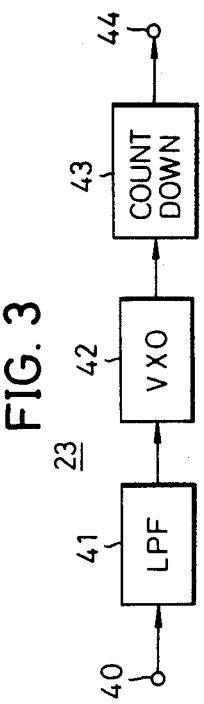
FIG. 3 is a systematic block diagram showing an example of a variable frequency oscillator within the block system shown in FIG. 1.

The variable frequency oscillator 23 has a construction shown in FIG. 3. The phase error signal from the phase comparator 20 is supplied to a lowpass filter 41 through a terminal 40, and a direct-current (DC) component (DC phase error) of the phase error signal is obtained at the above lowpass filter 41. An output signal of the lowpass filter 41 is supplied to a voltage controlled crystal oscillator (hereinafter simply referred to as a VXO) 42, to variably control the oscillation frequency. Generally, the oscillation frequency of VXO is quite stable, and the varying range is lower than approximately 0.2% in peak-to-peak values. Accordingly, the above VXO 42 operates as a variable phase oscillator rather than varying the frequency. Since the VXO 42 stably oscillates at frequencies in the order of MHz, for example, the oscillation frequency is set at a frequency equal to a chrominance sub-carrier frequency $f_{sc}$ or a frequency equal to an integer multiple of the frequency $f_{sc}$ ($4f_{sc}$, for example). An output signal of the VXO 42 is supplied to a count-down circuit 43 wherein the frequency of the signal supplied thereto is reduced to 750 Hz, for example. An output of the above count-down circuit 43 is supplied to a motor control circuit 24 through an output terminal 44.

A rotational phase detector 26 is provided in relation to a motor 25 for rotating the turntable 11. This rotational phase detector 26 is of a known construction, for example, in which a magnetic head is provided closely opposing a rotary plate provided on a rotary shaft of the motor 25, where the rotary plate is embeddedly provided with a magnet. In a case where four fields of video signals are recorded per one track turn of the disc 10, the motor 25 rotates the turntable 11 at a rotational speed of 15 rps. The rotational phase detector 26 generates 750 pulses per second, for example.

The output pulse of the rotational phase detector 26 is supplied to the motor control circuit 24 wherein the phases of the output pulse and the output oscillation frequency signal from the variable frequency oscillator 23 are compared. Hence, the rotation of the motor 25 is thus controlled by a control signal respective of the phase difference obtained at the motor control circuit 24. Therefore, the motor 25 is controlled so that the DC component of the phase difference between the rotational phase of the motor 25 and the phase of the output signal from the variable frequency oscillator 23 becomes zero.

Accordingly, the rotational phase of the disc 10 is controlled so that the jitter compensation mechanism constructed from the jitter compensation coil 34 of the signal pickup device 12, and the resilient support member for the cantilever 31, can perform a jitter compensation operation about a neutral position as the center position. Hence, the dynamic range of the jitter compensation mechanism can be small. Apparently, from the operational point of view, the above is equivalent to using a jitter compensation mechanism having an infinitely large dynamic range. Therefore, the alternating-cuttent (AC) jitter component can always be effectively compensated, even when the reproducing stylus 13 is forcibly displaced to change the reproducing track upon special reproduction.

In a case where the reproducing apparatus is put into a so-called pause mode in which reproduction is temporarily stopped, a horizontal synchronizing signal is not supplied to the phase comparator 20 from the synchronizing signal separation circuit 19, since signal reproduction is not performed in this mode of operation. However, the varying range of the rotation of the motor 25 corresponds to the varying range of the output signal of the VXO 42, and is quite narrow. Accordingly, the motor 25 stably rotates at substantially the normal rotational speed even during the above pause mode. Moreover, when the reproducing apparatus is released from the pause mode and the reproduced horizontal synchronizing signal is again supplied to the phase comparator 20, a rotation control system with respect to the motor 25 is operated. Since the motor 25 is rotating at substantially the normal rotational speed, a stable rotational control operation is immediately performed.

Hence, by use of the above VXO 42, the motor 25 accurately rotates at a substantially constant rotational speed even when the reproduced signal for the phase comparison does not exist. Thus, a complex sequential control need not be performed to change over signals, by detecting whether the rotation of the motor has reached the normal rotational speed or detecting whether the reproduced signal for the phase comparison exists.

There is only a 0.7% frequency difference between the horizontal synchronizing signals of the NTSC system and the PAL system. Accordingly, a disc in which a color video signal of the PAL system (or the NTSC system) is recorded can be finely reproduced while performing jitter compensation in a reproducing apparatus of the NTSC system (or the PAL system), that is, to perform an interchanged reproduction, by rotating the motor 25 at a rotational speed which is faster (or slower) than the normal rotational speed by 0.7% so that a horizontal scanning frequency of the NTSC system (or the PAL system) can be obtained.

Figure 4:
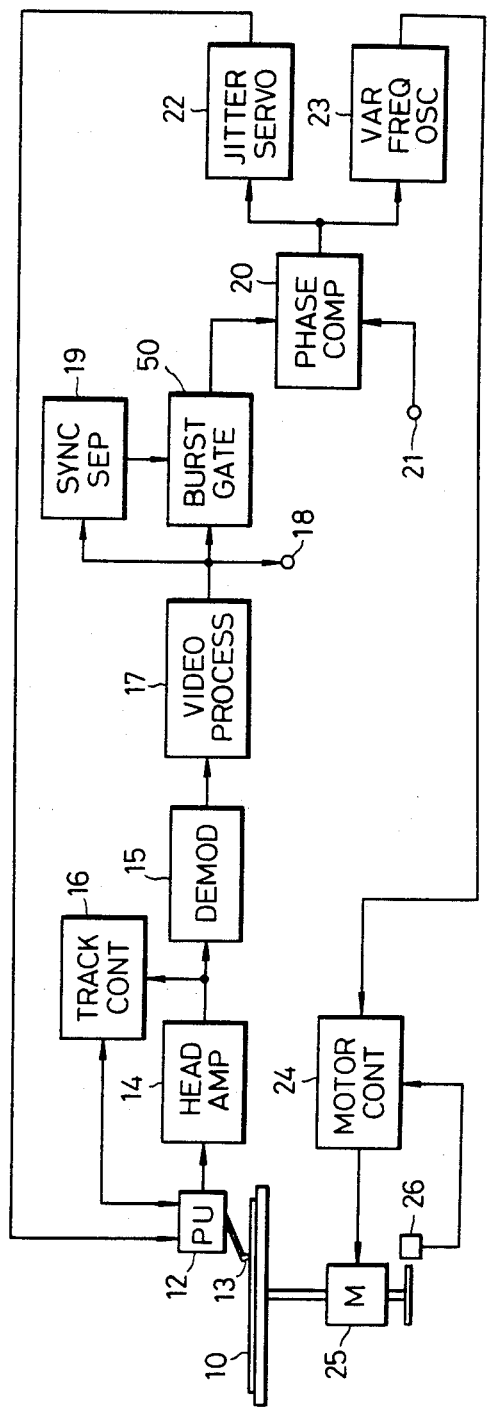
FIG. 4 is a systematic block diagram showing another embodiment of a jitter compensation system according to the present invention.

Next, description will be given with respect to another embodiment of a system according to the present invention, with reference to FIG. 4. In FIG. 4, those parts which are the same as those corresponding parts in FIG. 1 are designated by like reference numerals, and their description will be omitted.

The output signal of the video signal processing circuit 17 is supplied to the synchronizing signal separation circuit 19 and to a burst gate circuit 50. The horizontal synchronizing signal separated at the synchronizing signal separation circuit 19 is supplied to the burst gate circuit 50 wherein the color burst signal within the reproduced color video signal supplied from the video signal processing circuit 17 is extracted. The extracted color burst signal is supplied to the phase comparator 20 wherein the phase of the extracted color burst signal is compared with the phase of the external reference signal having a frequency equal to the chrominance subcarrier frequency.

In the present embodiment of the invention, phase comparison is not performed between a signal at a certain point in time within the color burst signal and the above reference signal. In the present embodiment of the invention, phase comparison is performed between the entire color burst signal extracted from the reproduced color video signal and the above reference signal. Accordingly, the jitter compensation operation can effectively be performed when the color video signal is of the NTSC system as well as when the color video signal is of the PAL system.

Moreover, in the above embodiment of the invention in which the horizontal synchronizing signal is used to perform the phase comparison between the reference signal at the phase comparator 20, jitter detection can effectively be performed even during the period in which the color burst signal within the vertical blanking period does not exist. However, according to the present embodiment of the invention, the color burst signal is superior as compared to the horizontal synchronizing signal when considering the signal-to-noise (S/N) ratio, and the jitter compensation operation can effectively be performed with respect to a so-called direct color system in which the carrier chrominance signal is directly recorded without performing frequency conversion.

Further, this invention is not limited to these embodiments but various variations and modifications may be made without departing from the scope of the invention.

What is claimed is:

1. A jitter compensation system in a reproducing apparatus having a motor for rotating a rotary medium with video signals recorded thereon, and a reproducing transducer including an element for reproducing said recorded video signal from said rotary recording medium, said jitter compensation system comprising:
   separation means for separating a horizontal synchronizing signal having a first phase from the video signal reproduced by said reproducing transducer;
   means for supplying a first reference signal having a second phase;
   phase comparing means for comparing the phases of said separated horizontal synchronizing signal and the first reference signal to produce a first phase comparison error signal;
   means for displacing the reproducing element of said reproducing transducer along a relative scanning direction with respect to said rotary recording medium, in response to the output error signal of said phase comparing means;
   variable frequency oscillating means responsive to the first phase comparison error signal of said phase comparing means, for controlling the output oscillation frequency, said variable frequency oscillating means producing a second reference signal;
   detection means for detecting the rotational phase of said motor; and
   control means for comparing phases of outputs of said variable frequency oscillating means and said detection means and for producing a second phase comparison error signal, to control the rotation of said motor responsive to said second phase comparison error signal.

2. A jitter compensation system as claimed in claim 1 in which said variable frequency oscillating means responds to a direct-current component of the first phase comparison error signal of said phase comparing means.

3. A jitter compensation system as claimed in claim 1 in which said variable frequency oscillating means consists of a lowpass filter for obtaining a direct-current component of the output error signal of said phase comparing means, a variable frequency oscillator supplied with an output signal of said lowpass filter, said variable frequency oscillator having an oscillation frequency higher than the output signal frequency of said detection means, and a frequency reducer for reducing the output oscillation frequency of said variable frequency oscillator to a frequency equal to the output signal frequency of said detection means.

4. A jitter compensation system as claimed in claim 3 in which said variable frequency oscillator is a voltage controlled quartz oscillator.

5. A jitter compensation system as claimed in claim 4 in which said voltage controlled quartz oscillator produces a signal having a frequency equal to a color video signal chrominance sub-carrier frequency or a frequency which is an integer multiple of the color video signal chrominance sub-carrier frequency.

6. A jitter compensation system in a reproducing apparatus having a motor for rotating a rotary recording medium having video signals recorded thereon, and a reproducing transducer including an element for reproducing said recorded color video signal from said rotary recording medium, said jitter compensation system comprising:
   separation means for separating a color burst signal having a first phase from said color video signal reproduced by said reproducing transducer;
   means for supplying a first reference signal having a second phase;
   phase comparing means for comparing the phases of said separated color burst signal and the first reference signal supplied thereto, to produce a first phase comparison error signal;
   means for displacing the reproducing element of said reproducing transducer along a relative scanning direction with respect to said rotary recording medium, in response to the first phase comparison error signal of said phase comparing means;
   variable frequency oscillating means supplied with the first phase comparison error signal of said phase comparing means, for controlling the output oscillation frequency, said variable frequency oscillating means producing a second reference signal;
   detection means for detecting the rotational phase of said motor; and
   control means for comparing the phases of outputs of said variable frequency oscillating means and of said detection means and for producing a second phase comparison error signal, to control the rotation of said motor by said second phase comparison error signal.

* * * * *